United States Patent
Iwauchi

(10) Patent No.: US 9,836,260 B2
(45) Date of Patent: Dec. 5, 2017

(54) COMMUNICATION APPARATUS, TERMINAL APPARATUS, CONTROL METHODS THEREOF, AND NON-TRANSITORY COMPUTER-READABLE STORAGE MEDIUM

(71) Applicant: CANON KABUSHIKI KAISHA, Tokyo (JP)

(72) Inventor: Nobuyuki Iwauchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/496,087

(22) Filed: Apr. 25, 2017

(65) Prior Publication Data

US 2017/0228203 A1    Aug. 10, 2017

Related U.S. Application Data

(60) Continuation of application No. 15/014,230, filed on Feb. 3, 2016, now Pat. No. 9,674,378, which is a
(Continued)

(30) Foreign Application Priority Data

Jul. 4, 2014    (JP) .................................. 2014-139166

(51) Int. Cl.
*H04N 1/00*    (2006.01)
*G06F 3/12*    (2006.01)

(52) U.S. Cl.
CPC .......... *G06F 3/1236* (2013.01); *G06F 3/1203* (2013.01); *G06F 3/1292* (2013.01);
(Continued)

(58) Field of Classification Search
CPC .... G06F 3/1236; G06F 3/1292; G06F 3/1203; H04N 1/00973; H04N 1/00251;
(Continued)

(56) References Cited

U.S. PATENT DOCUMENTS 9,041,965 B2    5/2015    Asai .............................. 358/1.15
9,294,870 B2    3/2016    Matsuda
(Continued)

FOREIGN PATENT DOCUMENTS

CN    1802835 A    7/2006
CN    101534505 A    9/2009
(Continued)

OTHER PUBLICATIONS

Extended European Search Report—EP Application No. 15001885.1 dated Apr. 8, 2016.
(Continued)

*Primary Examiner* — Allen H Nguyen
(74) *Attorney, Agent, or Firm* — Fitzpatrick, Cella, Harper & Scinto

(57) ABSTRACT

According to the present invention, when a terminal apparatus is brought close to a printing apparatus serving as a processing apparatus, the terminal apparatus uses its own NFC unit to acquire, from the printing apparatus, information for communicating with each of one or more network connection units provided in the printing apparatus. Then, using a communication unit, the terminal apparatus then searches for the printing apparatus on a network in accordance with the acquired information. In the case where the terminal apparatus has successfully identified the printing apparatus as being present on the network, the terminal apparatus transmits a processing request to the printing apparatus successfully identified on the network via the communication unit.

22 Claims, 11 Drawing Sheets

Related U.S. Application Data division of application No. 14/747,375, filed on Jun. 23, 2015, now Pat. No. 9,565,320.

(52) U.S. Cl.
CPC ..... *H04N 1/00251* (2013.01); *H04N 1/00307* (2013.01); *H04N 1/00973* (2013.01); *H04N 2201/006* (2013.01); *H04N 2201/0039* (2013.01); *H04N 2201/0041* (2013.01); *H04N 2201/0055* (2013.01); *H04N 2201/0082* (2013.01)

(58) Field of Classification Search
CPC ....... H04N 1/00307; H04N 2201/0055; H04N 2201/0041; H04N 2201/0039; H04N 2201/006; H04N 2201/0082
USPC ....................................................... 358/1.15
See application file for complete search history.

(56) References Cited

U.S. PATENT DOCUMENTS

| | | | |
|---|---|---|---|
| 9,313,363 | B2 | 4/2016 | Ma |
| 2009/0103124 | A1 | 4/2009 | Kimura et al. ............... 358/1.15 |
| 2011/0177780 | A1 | 7/2011 | Sato et al. ................... 455/41.1 |
| 2013/0231051 | A1* | 9/2013 | Naruse .................. G06F 3/1204 455/41.2 |
| 2013/0258382 | A1 | 10/2013 | Sato ............................. 358/1.13 |
| 2013/0312062 | A1 | 11/2013 | Kuwabara ........................ 726/3 |
| 2014/0185088 | A1 | 7/2014 | Lee et al. |
| 2014/0213190 | A1* | 7/2014 | Yamaoka .............. G06F 3/1204 455/41.3 |
| 2014/0240762 | A1 | 8/2014 | Shiraga ........................ 358/1.15 |
| 2014/0320908 | A1 | 10/2014 | Iwauchi et al. ........ G06F 3/1292 |
| 2014/0355057 | A1 | 12/2014 | Jang ............................. 358/1.15 |

FOREIGN PATENT DOCUMENTS

| | | | |
|---|---|---|---|
| CN | 102130707 A | 7/2011 | |
| CN | 103885732 A | 6/2014 | |
| CN | 103906194 A | 7/2014 | |
| EP | 2 637 092 | 9/2013 | ............... G06F 3/12 |
| EP | 2 645 265 | 10/2013 | ............. G06F 13/38 |
| EP | 2 720 449 | 4/2014 | ................ H04N 1/00 |
| JP | 2011-182449 | 9/2011 | |

OTHER PUBLICATIONS

XP13126607A—Methods for out-of-band peer to peer WLAN configuration—Motorola, Inc.; pp. 1-12 (2008).
Chinese Office Action issued corresponding Chinese Application No. 201510378376.0 dated Oct. 9, 2017.

* cited by examiner

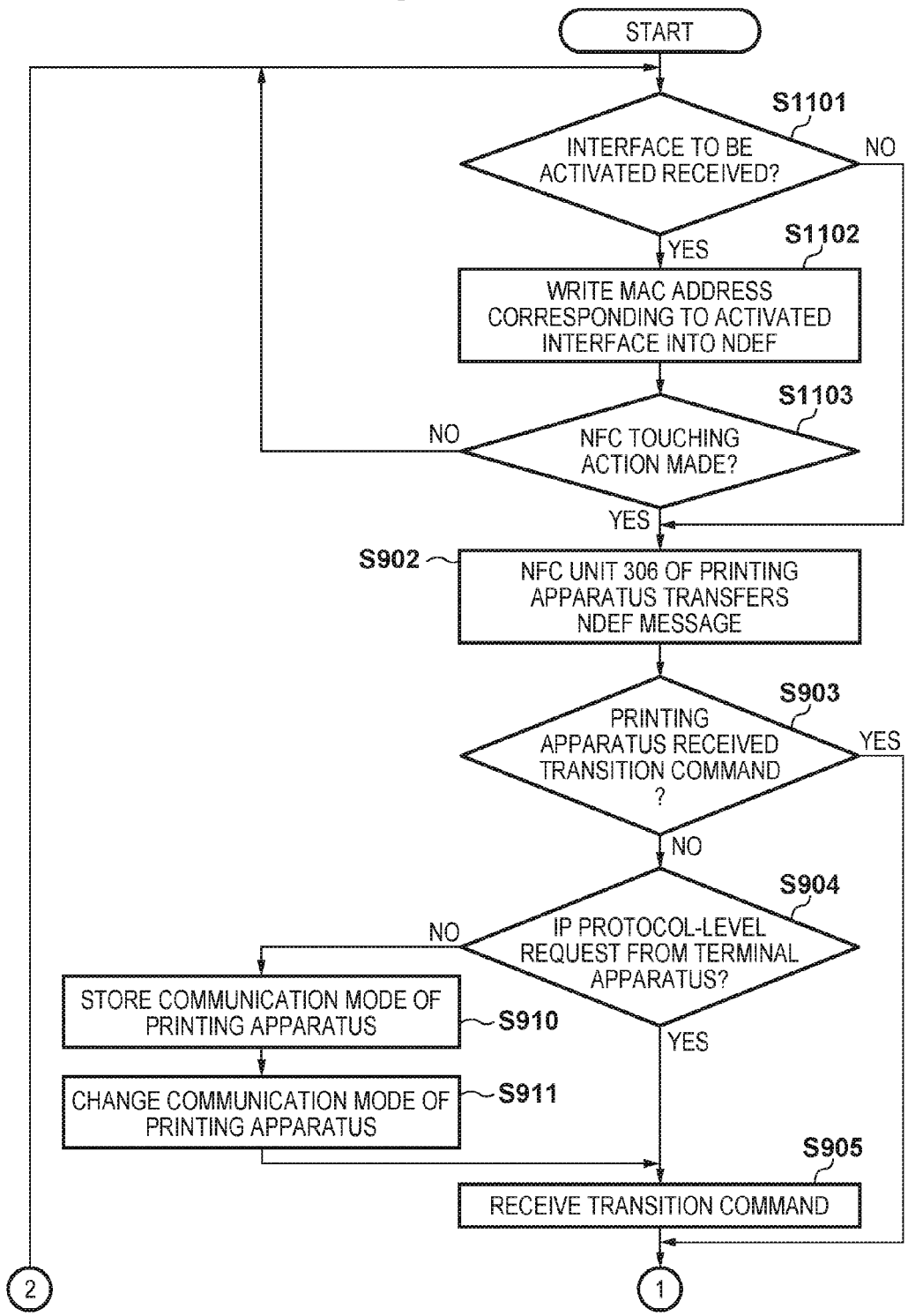

COMMUNICATION APPARATUS, TERMINAL APPARATUS, CONTROL METHODS THEREOF, AND NON-TRANSITORY COMPUTER-READABLE STORAGE MEDIUM

CROSS REFERENCE TO RELATED APPLICATIONS

This application is a continuation of U.S. application Ser. No. 15/014,230, filed Feb. 3, 2016, which is a divisional of U.S. application Ser. No. 14/747,375, filed on Jun. 23, 2015, now U.S. Pat. No. 9,565,320, issued Feb. 7, 2017, which claims priority to Japanese Patent Application No. 2014-139166, filed Jul. 4, 2014. The entire disclosures of each of those applications are hereby incorporated by reference, as if set forth fully herein.

BACKGROUND OF THE INVENTION

Field of the Invention

The present invention relates to communication apparatuses, terminal apparatuses, control methods thereof, and a non-transitory computer-readable storage medium.

Description of the Related Art

It has recently become possible for printers to receive images from external devices such as digital cameras, cellular phones, and the like and print those images by communicating wirelessly with such external devices. In such cases, the printer and the external device initially identify their respective communication partners through a short distance wireless communication technique as exemplified by NFC (Near Field Communication). A technique is also known where the printer then receives an image file to be printed from the external device using a different wireless communication technique that is faster than short distance wireless communication.

Meanwhile, with a printer provided with multiple interfaces such as wired LAN and wireless LAN, a user can print using one of the interfaces. In a conventional printer, even if multiple interfaces are provided, it is typical for communication to be carried out using only one of the interfaces.

Recently, a method in which NFC is used to connect a terminal apparatus and an external device to a common access point and ensure that an Internet connection is not cut off has been proposed. Japanese Patent Laid-Open No. 2011-182449 is known as a document that discloses such a method.

Although this document is useful in the case where both the terminal and the apparatus are on the same network and can therefore connect to each other, there is a problem in that when such is not the case, the terminal cannot easily make processing requests (for printing, for example).

SUMMARY OF THE INVENTION

Having been achieved in light of the aforementioned problems, the present invention provides a technique that makes it possible, through a simple operation, to specify a network being used from among a plurality of network connection units provided in a processing apparatus and transmit a processing request from a terminal apparatus to the processing apparatus.

According to a first aspect of the present invention, there is provided a communication apparatus capable of executing short distance wireless communication, the apparatus comprising: a first interface used when carrying out communication at a higher speed than the short distance wireless communication; a second interface used when carrying out communication at a higher speed than the short distance wireless communication; a receiving unit that receives a selection instruction for an interface to be activated; a writing unit that writes network information corresponding to the interface, of the first and second interfaces, that has been activated by the selection instruction into short distance wireless communication information transmitted through the short distance wireless communication; and a transmitting unit that transmits the short distance wireless communication information to a communication partner apparatus through the short distance wireless communication.

According to a second aspect of the present invention, there is provided a communication apparatus capable of communicating with a communication partner apparatus, the communication apparatus comprising: a first changing unit that changes a connection method from a connection method using an external access point to a method for making a peer-to-peer connection with the communication partner apparatus; and a second changing unit that, in the case where a predetermined condition has been met after the connection method has been changed, changes from the peer-to-peer connection to a connection using the external access point.

According to a third aspect of the present invention, there is provided a control method for a communication apparatus including a first interface used when carrying out communication at a higher speed than short distance wireless communication and a second interface used when carrying out communication at a higher speed than the short distance wireless communication, the method comprising: a receiving step of receiving a selection instruction for an interface to be activated; a writing step of writing network information corresponding to the interface, of the first and second interfaces, that has been activated by the selection instruction into short distance wireless communication information transmitted through the short distance wireless communication; and a transmitting step of transmitting the short distance wireless communication information to a communication partner apparatus through the short distance wireless communication.

According to a fourth aspect of the present invention, there is provided a control method for a communication apparatus capable of communicating with a communication partner apparatus, the method comprising: a first changing step of changing a connection method from a connection method using an external access point to a method for making a peer-to-peer connection with the communication partner apparatus; and a second changing step of changing, in the case where a predetermined condition has been met after the connection method has been changed, from the peer-to-peer connection to a connection using the external access point.

According to a fifth aspect of the present invention, there is provided a non-transitory computer-readable storage medium storing a computer program causing a computer to execute each step of the method in the third aspect of the invention.

According to a sixth aspect of the present invention, there is provided a non-transitory computer-readable storage medium storing a computer program causing a computer to execute each step of the method in the fourth aspect of the invention.

According to the present invention, it is possible, through a simple operation of bringing a terminal apparatus close to a processing apparatus, to specify a network being used from among a plurality of network connection units provided in the processing apparatus and transmit a processing request from the terminal apparatus to the processing apparatus.

Further features of the present invention will become apparent from the following description of exemplary embodiments (with reference to the attached drawings).

BRIEF DESCRIPTION OF THE DRAWINGS

FIGS. 11A and 11B are flowcharts illustrating processing performed by a printing apparatus according to a fourth embodiment.

DESCRIPTION OF THE EMBODIMENTS

Hereinafter, exemplary embodiments of the present invention will be described in detail with reference to the drawings. Note that unless otherwise specified, the scope of this invention is not intended to be limited only to the relative arrangements of the constituent elements, screens that are displayed, and so on described in the embodiments.

System Configuration

Figure 1:
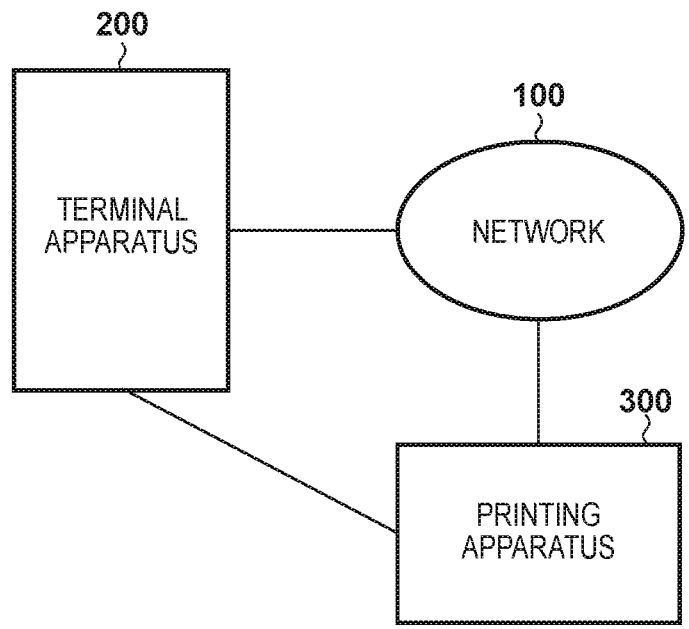
FIG. 1 is a diagram illustrating the configuration of a printing system according to an embodiment.

FIG. 1 is a diagram illustrating the configuration of a network processing system according to an embodiment. This system is built around a network 100, and is constituted by a mobile-type terminal apparatus 200 capable of connected to the network 100 and a printing apparatus 300, serving as a processing apparatus, that carries out processing in response to requests from the terminal apparatus 200. The terminal apparatus 200, which functions as a communication apparatus, includes at least two wireless communication units having different communication speeds (or communication ranges). The terminal apparatus 200 may be any type of apparatus that can handle files to be printed, including personal information terminals such as PDAs (Personal Digital Assistants), smartphones and cellular phones, digital cameras, and so on.

The printing apparatus 300 that functions as the communication apparatus includes a reading function for optically reading a document placed on an original platform and a printing function for printing using a print engine such as an ink jet printer, and may also include a fax function, a telephony function, and so on.

The network 100 and the printing apparatus 300 are connected over a wired LAN or a wireless LAN. The network 100 and the terminal apparatus 200 are connected over a wireless LAN. The terminal apparatus 200 and the printing apparatus 300 are both capable of communicating through short distance wireless communication. Furthermore, because the terminal apparatus 200 and the printing apparatus 300 both have wireless LAN functions, these apparatuses are capable of peer-to-peer ("P2P" hereinafter) communication through mutual authentication.

Figure 2:
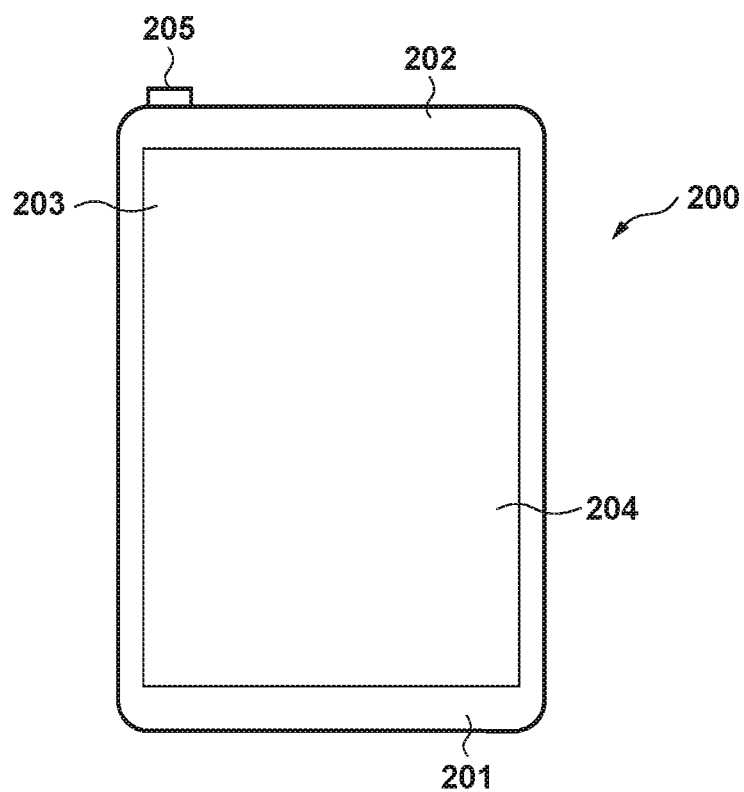
FIG. 2 is a diagram illustrating the external appearance of a terminal apparatus.

FIG. 2 is a diagram illustrating an external view of the terminal apparatus 200. A smartphone is illustrated as an example in the present embodiment. "Smartphone" refers to a multiple-function cellular phone that includes a camera, an Internet browser, an email function, and so on in addition to cellular phone functionality.

An NFC (Near Field Communication) unit 201 is a unit that carries out short distance wireless communication. The NFC unit 201 can carry out communication by actually bringing the NFC unit 201 to within a predetermined distance (approximately 10 cm) from the NFC unit of a partner device (an NFC unit of the printing apparatus 300, in this embodiment).

A wireless LAN unit 202 is a unit for communicating over the wireless LAN, which is faster than the NFC communication, and is provided within the terminal apparatus 200. A display unit 203 is a display having an LCD-type display mechanism, for example. An operating unit 204 has a touch panel-type operating mechanism, and detects information indicating touches made by a user. In this case, a typical operating method involves displaying button icons, a software keyboard, and so on in the display unit 203, with events being issued when the user presses a button by touching the operating unit 204. A power key 205 is used when turning the power on and off.

Figure 3A:
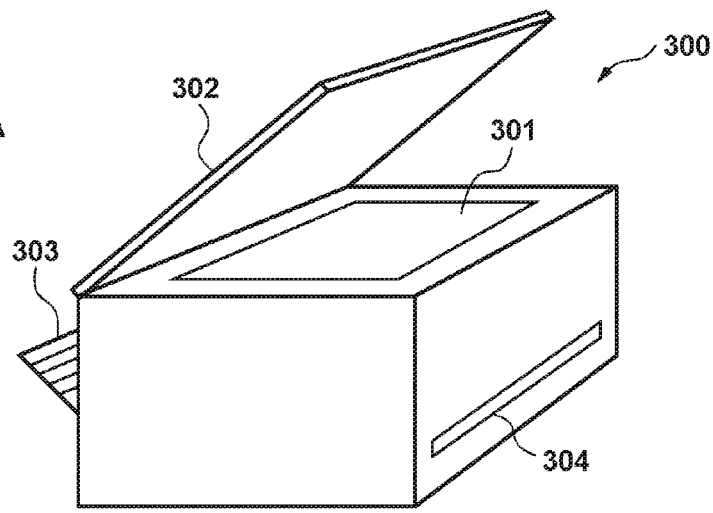
FIGS. 3A and 3B are diagrams illustrating the external appearance of a printing apparatus.
Figure 3B:
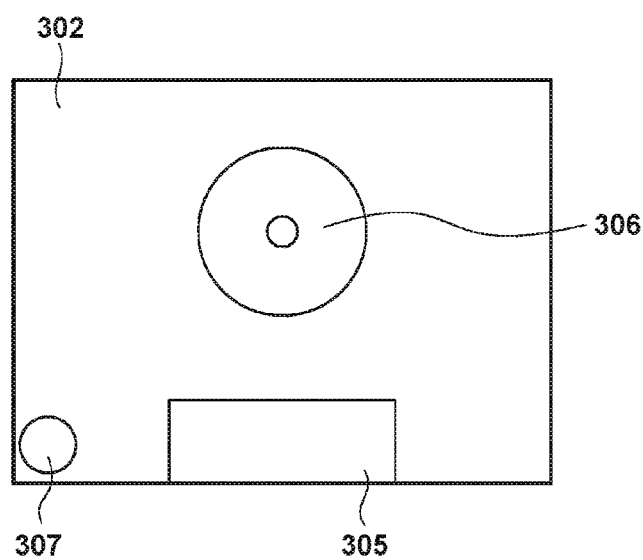

FIGS. 3A and 3B are diagrams illustrating an external view of the printing apparatus 300. A Multi Function Printer (MFP) having a reading function (a scanner) is illustrated as an example in the present embodiment. As illustrated in FIG. 3A, an original platform 301 is a transparent platform made of glass, and is used for placing a document and reading the document with the scanner. An original cover plate 302 is a cover for ensuring that reading light does not escape to the exterior when reading a document using the scanner. A print paper insertion port 303 is an insertion port for setting various sizes of paper. Paper set in the print paper insertion port 303 is transported one sheet at a time to a printing unit, where the paper is printed onto and then discharged from a print paper discharge port 304.

FIG. 3B is a top view of the original cover plate 302. An operation panel console unit 305 and an NFC unit 306 are disposed on an upper portion of the original cover plate 302. The NFC unit 306 is a unit for carrying out short distance wireless communication, and corresponds to a location where the terminal apparatus 200 is actually brought close to the printing apparatus 300. A predetermined distance (approximately 10 cm) from the NFC unit 306 is an active distance for a connection. A wireless LAN antenna 307 is an embedded antenna for communication over a wireless LAN.

Note that "short distance wireless communication" refers to wireless communication in which the communication range is a comparatively small predetermined range (one meter to several centimeters, for example), as exemplified by NFC.

Figure 4:
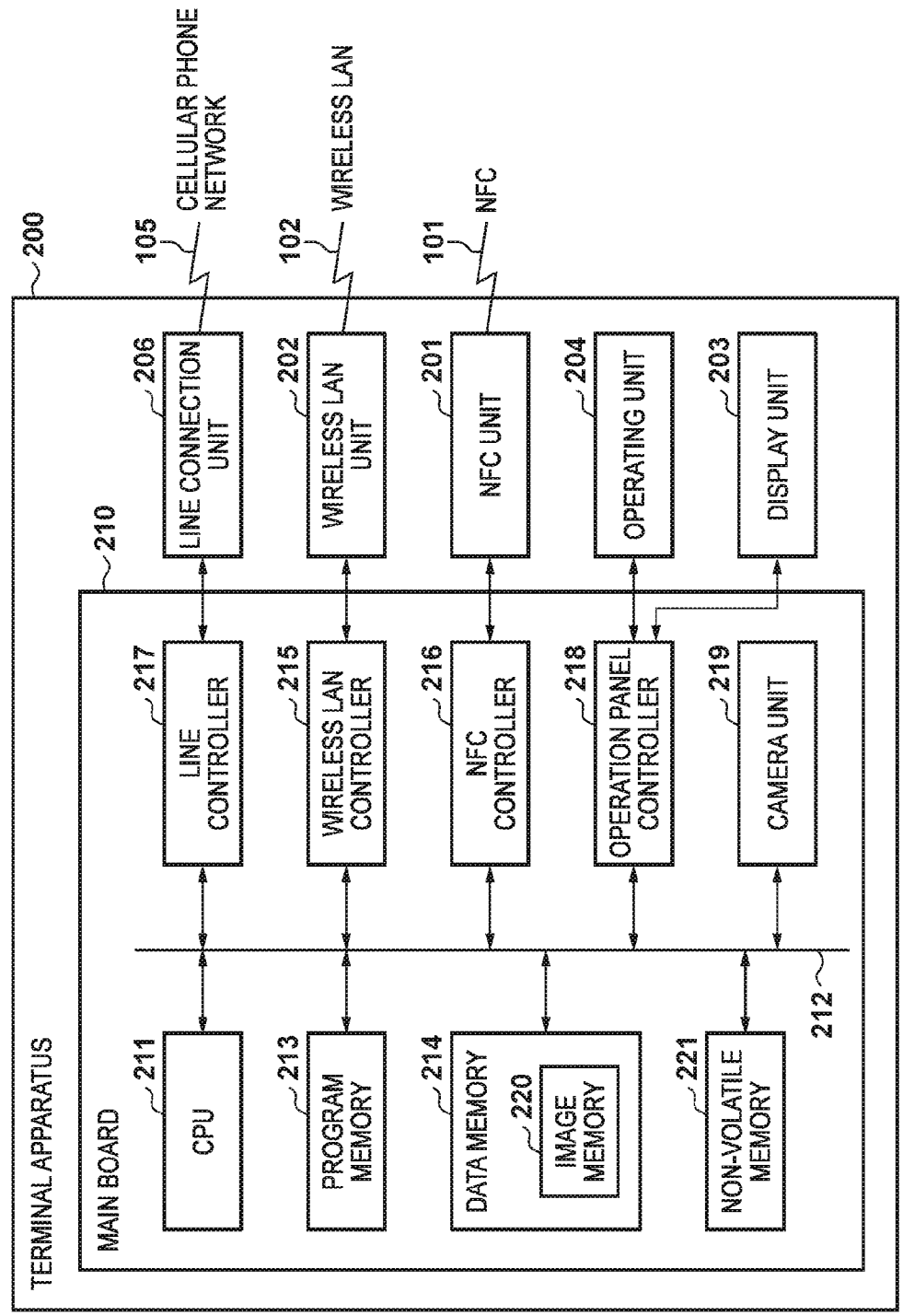
FIG. 4 is a block diagram illustrating the configuration of a terminal apparatus.

FIG. 4 is a block diagram illustrating the terminal apparatus 200. The terminal apparatus 200 includes a main board 210 that controls the apparatus as a whole, the wireless LAN unit 202, the NFC unit 201, a line connection unit 206, the display unit 203, and the operating unit 204. Here, the wireless LAN unit 202, the NFC unit 201, the line connection unit 206, and a wired LAN unit 309 all function as communication units of the terminal apparatus 200.

A microprocessor-type CPU 211 disposed on the main board 210 executes processes in accordance with a control program stored in a ROM-type program memory 213 and data in a RAM-type data memory 214, which are connected to the CPU 211 via an internal bus 212.

The CPU 211 communicates with another communication terminal apparatus over a wireless LAN 102 by controlling the wireless LAN unit 202 via a wireless LAN controller 215. The CPU 211 detects a connection with another NFC terminal over NFC 101, exchanges data with the other NFC terminal, and so on by controlling the NFC unit 201 via an NFC controller 216. The CPU 211 can connect to a cellular phone network 105 and carry voice conversations, exchange data, and so on by controlling the line connection unit 206 via a line controller 217.

The CPU 211 can receive instructions from the user via the operating unit 204, display various types of menus, images, and the like in the display unit 203, and so on by controlling an operation panel controller 218. The CPU 211 can shoot images by controlling a camera unit 219, and stores shot images in an image memory 220 within the data memory 214. In addition to shot images, images acquired from the exterior via the cellular phone network 105, the wireless LAN 102, or NFC 101 can be stored in the image memory 220 or, conversely, transmitted to the exterior.

A non-volatile memory 221 is constituted by a memory such as flash memory, and holds data to be retained even when the power has been turned off. For example, in addition to telephone contact data, various types of communication connection information, and information of devices connected to in the past, image data to be retained, programs such as application software that realizes various types of functions in the terminal apparatus 200, and so on are stored as well.

Figure 5:
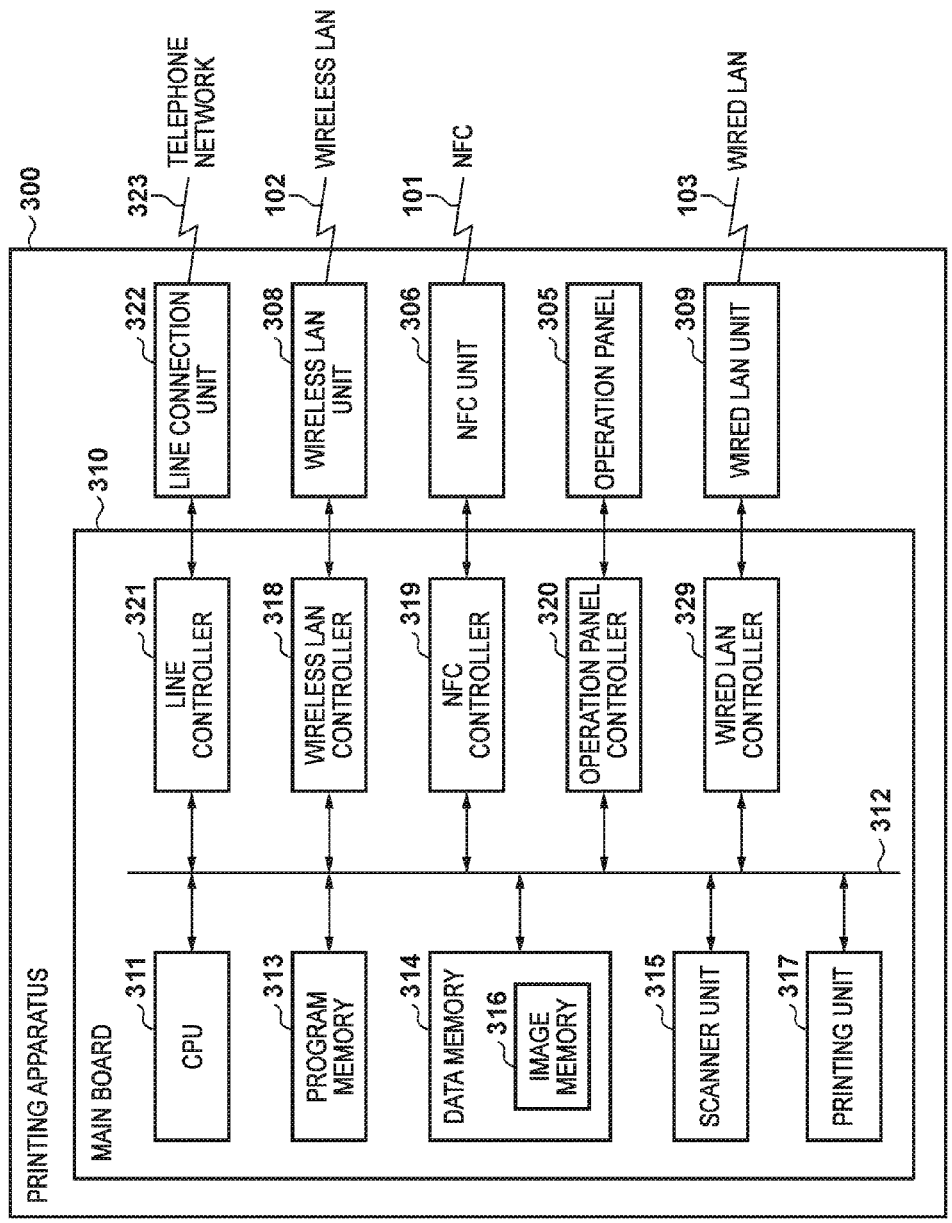
FIG. 5 is a block diagram illustrating the configuration of a printing apparatus.

FIG. 5 is a block diagram illustrating the configuration of the printing apparatus 300. The printing apparatus 300 includes a main board 310 that controls the apparatus as a whole, a line connection unit 322, a wireless LAN unit 308, the NFC unit 306, the wired LAN unit 309, and an operation panel 305. Here, the line connection unit 322, the wireless LAN unit 308, the NFC unit 306, and the wired LAN unit 309 all function as communication units of the printing apparatus 300. Note that the wireless LAN is capable of faster communication than the NFC unit, and the wired LAN is capable of even faster communication.

A microprocessor-type CPU 311 disposed on the main board 310 executes processes in accordance with a control program stored in a ROM-type program memory 313 and data in a RAM-type data memory 314, which are connected to the CPU 311 via an internal bus 312.

The CPU 311 reads a document by controlling a scanner unit 315, and stores read image data in an image memory 316 within the data memory 314. The CPU 311 can also print images in the image memory 316 within the data memory 314 onto a recording medium by controlling a printing unit 317.

The CPU 311 communicates with another communication terminal apparatus over the wireless LAN 102 by controlling the wireless LAN unit 308 via a wireless LAN controller 318. The CPU 311 also communicates with another communication terminal apparatus over a wired LAN 103 by controlling the wired LAN unit 309 via a wired LAN controller 329. The CPU 311 can detect a connection with another NFC terminal over NFC 101, exchange data with the other NFC terminal, and so on by controlling the NFC unit 306 via an NFC controller 319. The CPU 311 can connect to a telephone network 323 and exchange faxes, data, and so on by controlling the line connection unit 322 via a line controller 321.

The CPU 311 can display a status of the printing apparatus 300, function selection menus, and so on in the operation panel 305, accept operations made by the user, and so on by controlling an operation panel controller 320. As such, the operation panel 305 is constituted by various types of switches and buttons as well as a touch panel-equipped display.

Figure 6:
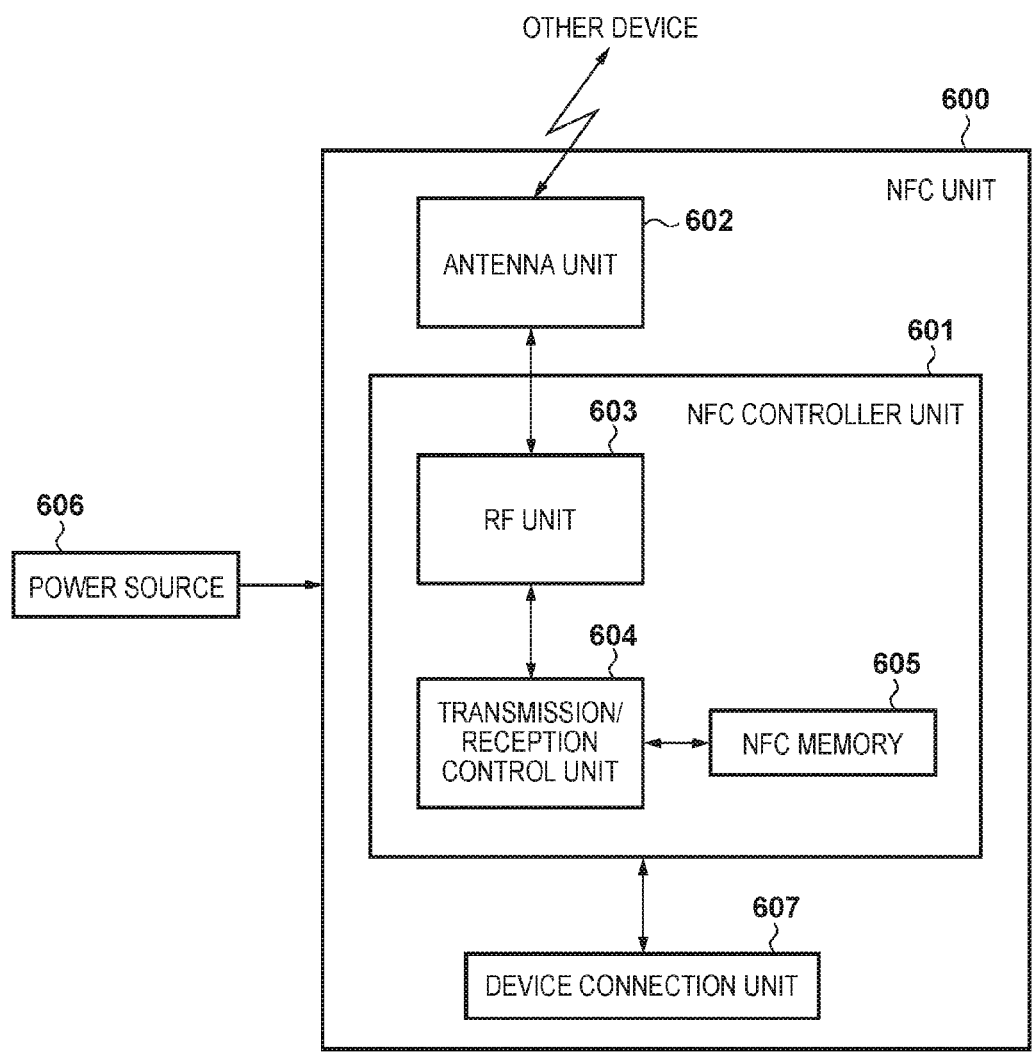
FIG. 6 is a block diagram illustrating the configuration of an NFC unit.

FIG. 6 is a block diagram illustrating, in detail, an NFC unit 600 used as the NFC unit 201 in the terminal apparatus 200 or as the NFC unit 306 in the printing apparatus 300.

In short distance wireless communication (NFC communication) performed by the NFC unit 600, an apparatus that outputs an RF (Radio Frequency) field and starts communication is called an "initiator". Meanwhile, an apparatus that carries out communication with the initiator in response to a command issued by the initiator is called a "target". The NFC unit has a passive mode and an active mode as communication modes.

In the passive mode, the target responds to a command from the initiator through load modulation. Accordingly, it is not necessary to supply power to the target. On the other hand, in the active mode, the target responds to a command from the initiator using an RF field emitted by the target itself. Accordingly, it is necessary to supply power to the target. The active mode has a characteristic of being capable of faster communication speeds than the passive mode.

The descriptions will now return to FIG. 6. An NFC controller unit 601, an antenna unit 602, an RF unit 603, a transmission/reception control unit 604, an NFC memory 605, a power source 606, and a device connection unit 607 are present in the NFC unit 600. The antenna unit 602 receives radio waves, carriers, and the like from other NFC devices, transmits radio waves, carriers, and so on to other NFC devices, and the like. The RF unit 603 has a function for modulating/demodulating analog signals into/from digital signal. The RF unit 603 has a synthesizer, identifies bands and channel frequencies, and carries out band and channel control through data by allocating frequencies.

Note that the NFC memory 605 is constituted by a non-volatile memory that can be read and written to. Even when power is not being supplied from the power source 606, data stored in the NFC memory 605 can be read and written as long as induced electromotive force is produced in the passive mode. Data storage control, including the reading and writing of data in the NFC memory 605, is realized by the NFC controller unit 601. Note that "when power is not being supplied from the power source 606" refers to a state in which a battery of the terminal apparatus 200 has been exhausted and power is not being supplied to the printing apparatus 300.

The transmission/reception control unit 604 carries out control regarding transmission and reception, including the assembly and disassembly of transmitted/received frames, preamble addition and detection, frame identification, and so on. The transmission/reception control unit 604 also controls the NFC memory 605, and reads and writes various types of data, programs, and the like. The transmission/reception control unit 604 receives a supply of power via the power source 606 when operating in the active mode. The transmission/reception control unit 604 communicates with devices (the CPU 211 of the terminal apparatus 200, the CPU 311 of the printing apparatus 300, and so on) through the device connection unit 607, communicates with other NFC devices within a communication range through carriers exchanged via the antenna unit 602, and so on. When operating in the passive mode, the transmission/reception control unit 604 receives a carrier from another NFC device via the antenna unit 602, receives a supply of power from the other NFC device through electromagnetic induction, communicates with the other NFC device by modulating the carrier, and exchanges data. Hereinafter, an action of bringing the (NFC unit 201 of the) terminal apparatus 200 toward the (NFC unit 306 of the) printing apparatus 300 will be referred to as an "NFC touching action".

First Embodiment

The present first embodiment describes a use case in which a user selects an image to be printed by operating the terminal apparatus 200 and prints the selected image using the printing apparatus 300 by carrying out an NFC touching action by touching the terminal apparatus 200 to the printing apparatus 300 that is to carry out the print with the image remaining in a selected state.

Figure 8:
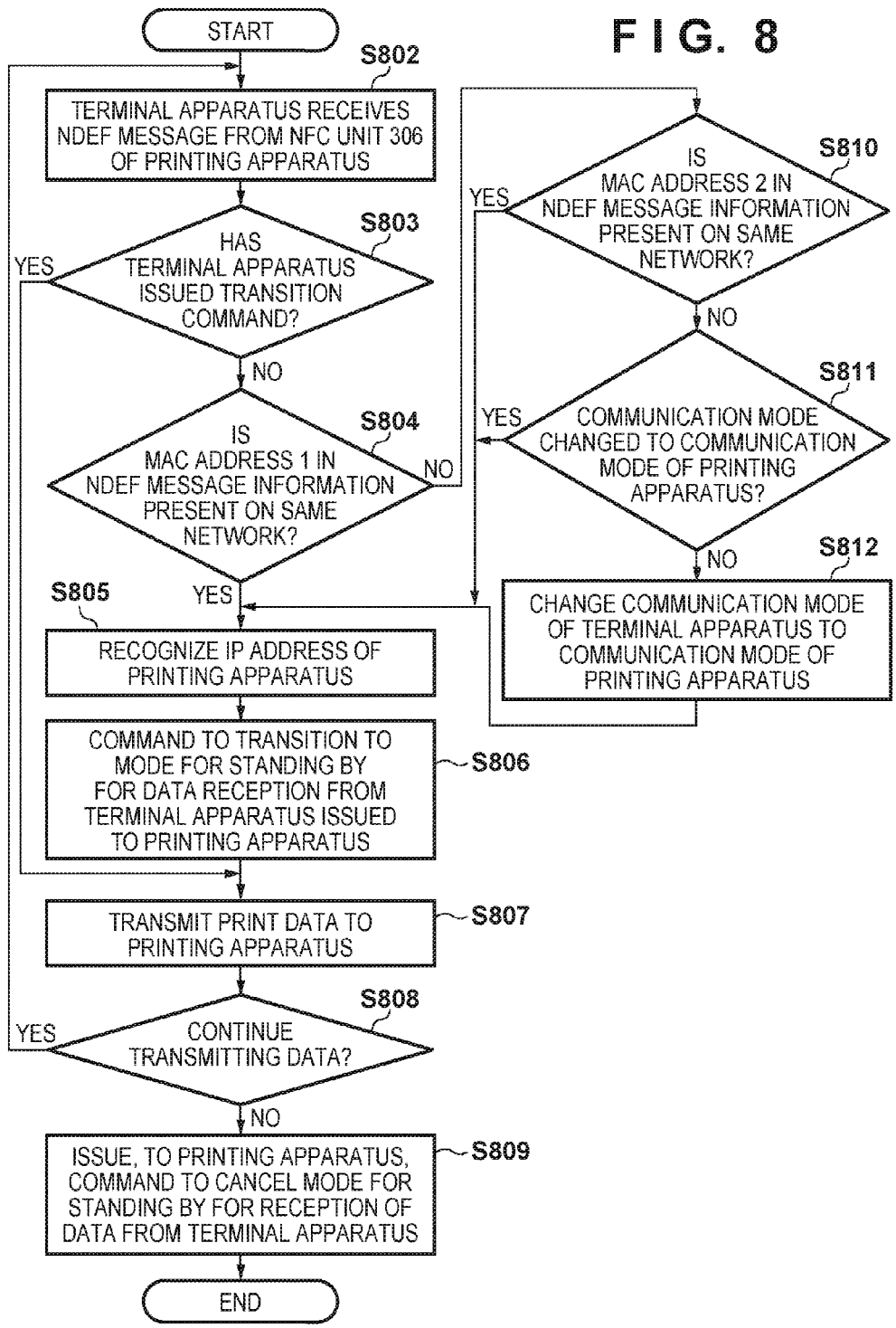
FIG. 8 is a flowchart illustrating processing performed by a terminal apparatus.

FIG. 8 is a flowchart illustrating processing carried out when an image specified using the terminal apparatus 200 is printed by the printing apparatus 300. Note that in the present application, flowcharts executed by the terminal apparatus 200 are realized by the CPU 211 of the terminal apparatus 200 reading out programs related to the flowchart and executing those programs. Meanwhile, processing steps in the flowcharts of the present application may be omitted as necessary.

First, the user selects image data stored in the image memory 220 through an operation made using the operating unit 204. A single or a plurality of pieces of image data may be selected here.

The user then performs an action for bringing the terminal apparatus 200, with the image in a selected state, toward the NFC unit 306 of the printing apparatus 300 that will be requested to carry out the processing (the NFC touching action). The terminal apparatus 200 and the printing apparatus 300 transition to an NFC communication mode as a result. Note that the transition to the NFC communication mode may be realized, for example, by the user making a setting in the operation panel of the printing apparatus 300, or may be realized automatically through the NFC touching action.

In step S802, the terminal apparatus 200 receives, from the NFC unit 306 of the printing apparatus 300, an NDEF message in the NFC memory 605 within that NFC unit 306.

Figure 7:
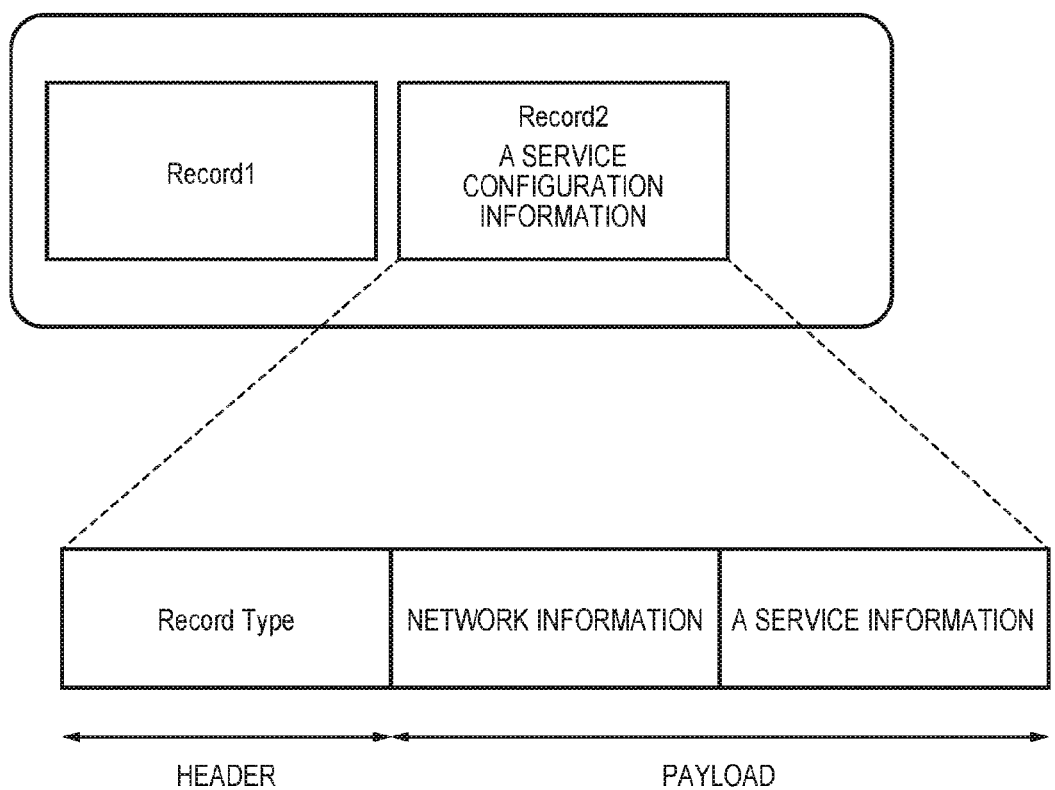
FIG. 7 is a diagram illustrating the structure of NDEF data saved in an NFC unit.

The structure of NDEF data saved in the NFC unit will be described using FIG. 7. In the NDEF data, a RecordType indicating what the NDEF message is is held in a first NDEF "Record1" that constitutes a header portion. Specifically, "Hq (HandoverRequest)", indicating a handover request message, "Hs (HandoverSelect)", indicating a message responding to the request, or the like is written in the Record Type. Note that because the NDEF data is transmitted to the communication partner apparatus through short distance wireless communication, the NDEF data is also sometimes called "short distance wireless communication information".

"Record2" is constituted by a RecordType containing details indicating that the packet in question is A service configuration information, and a Payload portion containing detailed network configuration information. Parameters regarding respective communication methods are held in the network information. Specifically, for two network interface units (or network interface cards (NICs)) in the printing apparatus 300, information of a first MAC address of a first unit and a second MAC address of a second unit is held in the network information. For example, a wired LAN MAC address and a wireless LAN MAC address are held in the network information. Through this, the terminal apparatus 200 can acquire the MAC address information of the physical interfaces in the printing apparatus 300 from the NDEF message. Although the present application describes an example in which the printing apparatus 300 has two network interface units, the number thereof is not particularly limited as long as the number is 1 or more.

Furthermore, peer-to-peer connection information ("peer-to-peer" will be abbreviated as "P2P" hereinafter) is held in the Payload portion. Specifically, information required for a P2P connection such as WiFi direct, including an SSID, encryption method, authentication method, network key, and the like, is held in this portion.

Generally speaking, the terminal apparatus 200 and the printing apparatus 300 cannot carry out data communication unless connected to the same access point. To circumvent this, the terminal apparatus 200 changes the wireless network configuration on the terminal apparatus 200 side using the P2P information acquired from the NDEF message received from the printing apparatus 300. Doing so enables the terminal apparatus 200 and the printing apparatus 300 to establish peer-to-peer communication and carry out data communication.

After receiving the NDEF message, in step S803, the terminal apparatus 200 determines whether a mode transition command for standing by for data reception from the terminal apparatus 200 has been issued to the printing apparatus 300. Information indicating whether or not the command has been issued is stored in the data memory 214 of the terminal apparatus 200. In the case where the mode transition command has not been issued, in step S804, whether the first MAC address in the NDEF message is present on the same network as the terminal apparatus 200 is confirmed (searched). In the case where the first MAC address is present on the same network, the terminal apparatus 200 can recognize an IP address of the printing apparatus 300 (step S805). For example, ICMP, MulticastDNS, or the like is used to recognize the IP address. Then, in step S806, the terminal apparatus 200 issues the mode transition command for standing by for data reception to the printing apparatus 300.

On the other hand, in the case where the first MAC address cannot be detected on the same network, in step S810, the terminal apparatus 200 confirms whether the second MAC address is present on the same network as the terminal apparatus 200. In the case where the second MAC address cannot be detected, in step S811, the terminal apparatus 200 refers to the P2P information held in the NDEF message acquired from the NFC unit 201 of the printing apparatus 300 and determines whether the communication mode of the terminal apparatus 200 is the same as the wireless LAN configuration in the P2P information. For example, the determination is carried out by the terminal apparatus 200 comparing the SSID of an access point provided in the printing apparatus 300 with the SSID set in the terminal apparatus 200 and determining whether or not the SSIDs are the same.

In the case where the communication mode of the terminal apparatus 200 does not match the P2P information, the terminal apparatus 200 changes the communication mode of the terminal apparatus 200 to the communication mode of the printing apparatus 300 (step S812). For example, the terminal apparatus 200 sets the SSID of the printing apparatus 300.

In this manner, there is a risk that the printing apparatus 300 cannot be detected in the case where the printing apparatus 300 includes a plurality of interfaces and only the interface information of one of the interfaces is returned. For example, in the case where the wireless LAN MAC address is held in the NDEF message despite the wired LAN being in an active state, the terminal apparatus 200 will search for the wireless LAN MAC address on the network. As a result, the NFC-touched printing apparatus 300 cannot be searched out even if the terminal apparatus 200 and the printing apparatus 300 are on the same network. However, carrying out the above processing makes it possible to correctly establish a connection between the terminal apparatus 200 and the printing apparatus 300.

In step S806, the terminal apparatus 200 issues the mode transition command for standing by for data reception from the terminal apparatus 200 to the printing apparatus 300. After the command is issued, in step S807, the terminal apparatus 200 converts the image data selected by the user into a format that can be printed by the printing apparatus 300 and transmits the data to the printing apparatus 300 via the wireless LAN unit 202 as print data. Although the terminal apparatus 200 is described as transmitting the print data to the printing apparatus 300 over the wireless LAN, the printing apparatus 300 does not necessarily receive the print data from the terminal apparatus 200 over the wireless LAN. This is because the data can also be received over the wired LAN connected to the access point.

After the transmission of all of the print data is complete, in step S808, the terminal apparatus 200 determines whether to continue transmitting print data. This determination may be carried out through a user operation, or when no operation is made for a set amount of time. When the printing ends, in step S809, the terminal apparatus 200 issues a command to cancel the mode for standing by for data reception to the printing apparatus 300. As a result, the connection between the terminal apparatus 200 and the printing apparatus 300 is canceled.

Figure 9:
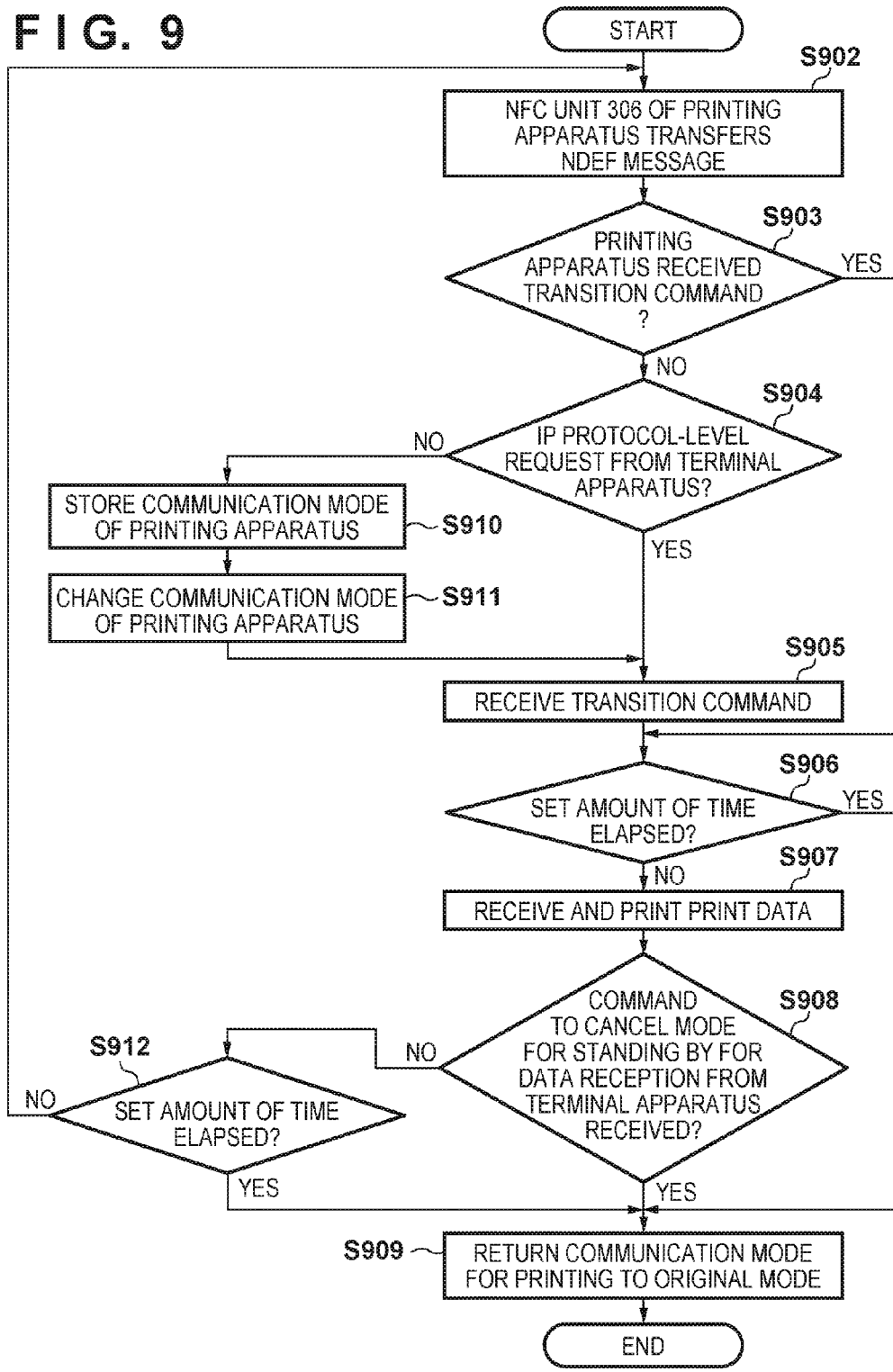
FIG. 9 is a flowchart illustrating processing performed by a printing apparatus.
Figure 10:
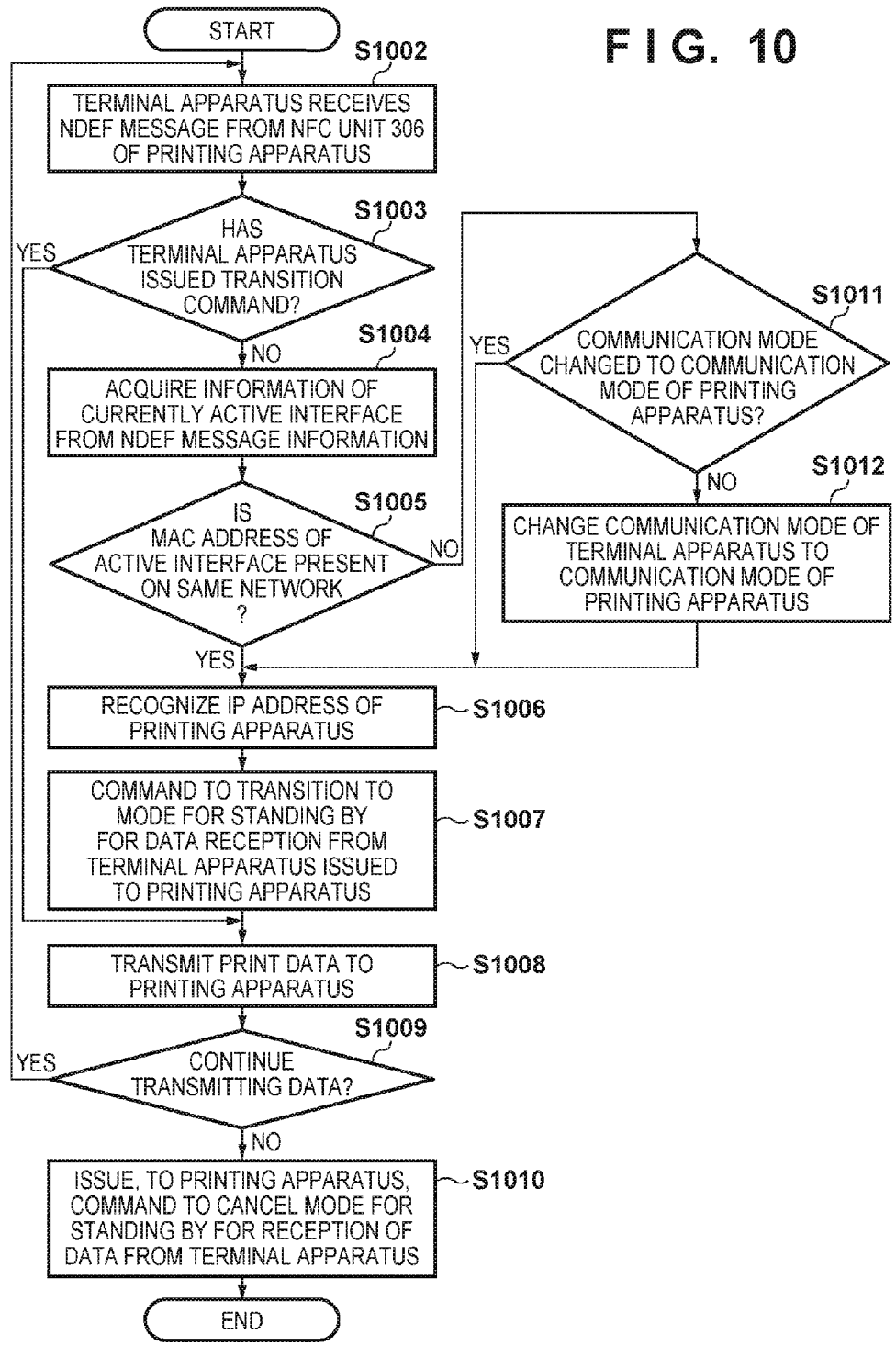
FIG. 10 is a flowchart illustrating processing performed by a terminal apparatus according to a second embodiment.

Next, processing performed by the printing apparatus 300 when printing an image received from the terminal apparatus 200 will be described using the flowchart illustrated in FIG. 9. In the present application, flowcharts executed by the printing apparatus 300 are realized by the CPU 311 of the printing apparatus 300 reading out programs related to the flowchart and executing those programs.

First, the user performs an action for bringing the (NFC unit 201 of the) terminal apparatus 200 toward the (NFC unit 306 of the) printing apparatus 300 (the NFC touching action). NFC communication through the respective NFC units is started as a result, and in step S902, the printing apparatus 300 transfers, to the terminal apparatus 200, the NDEF message held in the NFC memory within the NFC unit 306 of the printing apparatus.

Upon the NDEF message being transferred to the terminal apparatus 200, in step S903, the printing apparatus 300 determines whether the mode transition command for standing by for data reception from the terminal apparatus 200 has already been received.

If the mode transition command has not been received, in step S904, the printing apparatus 300 determines whether there is an IP protocol-level request from the terminal apparatus 200. In the case where there is an IP protocol-level request, the terminal apparatus 200 and the printing apparatus 300 can be confirmed as being on the same network, and thus the printing apparatus 300 stands by to receive the mode transition command for standing by for data reception issued by the terminal apparatus 200.

Then, in step S905, the printing apparatus 300 receives the mode transition command from the terminal apparatus 200. Meanwhile, in the case where it has been determined in step S904 that there is no IP protocol-level communication, the printing apparatus 300 stores (saves) the current communication mode of the printing apparatus 300 into the data memory 314 in step S910. The printing apparatus 300 then changes the communication mode of the printing apparatus 300 to the P2P mode communication mode in step S911. Then, as a result of the terminal apparatus 200 executing the processing of S812, the printing apparatus 300 and the terminal apparatus 200 can connect on the same network. For example, in the case where the printing apparatus 300 is operating in a communication mode that communicates using an external access point, S911 changes the communication mode to the P2P mode from the communication mode that communicates using the access point.

After communication is established, in step S907, the printing apparatus 300 receives the print data from the terminal apparatus 200 and prints the data. However, even in the case where communication is established, the communication mode for printing is returned to the original mode in step S909 in the case where no data is sent from the terminal apparatus 200 for a set amount of time in step S906.

After the printing, in step S908, the printing apparatus 300 determines whether a mode cancel standby command, for canceling the standby for data reception from the terminal apparatus 200, has been received. In the case where the cancel command has been received, if the communication mode for printing was changed in step S909, the communication mode is returned to the mode used immediately before the printing using NFC (in other words, the communication mode stored in S910).

A specific example of returning the communication mode will be described hereinafter. For example, in the case where the wireless LAN of the printing apparatus 300 is inactive, the wireless LAN inactive state is stored in step S910, the printing is executed in the P2P mode, and after the printing ends, the wireless LAN state is canceled and the processing ends. In other words, the communication mode of the printing apparatus 300 is changed to the wireless LAN inactive state. Meanwhile, in the case where the wireless LAN of the printing apparatus 300 is active and the printing apparatus 300 is on the same network as the terminal apparatus, the printing process is carried out through that communication mode, and after the printing ends, in step S909, the communication mode remains in that state.

In addition, in the case where one or both of the first and second interfaces of the printing apparatus 300 are active and those interfaces are not on the same network as the terminal apparatus, the states of the first and second interfaces are stored in step S911. The printing is then executed in the P2P mode, the states of the first and second interfaces are returned to their original states after the printing ends, and the processing then ends.

In this manner, according to the present embodiment, the optimal communication method can be automatically selected through an NFC touching action made using the terminal apparatus 200, even without the user switching the current communication mode. In the case where a mode cancel standby command is not sent from the terminal apparatus 200 for a set amount of time in step S908, allowing time to pass in step S912 makes it possible to return the communication mode to the immediately-previous communication mode in the case where the mode cancel standby command is not sent for the set amount of time.

A timer is thus used to measure the set amount of time, and the end of printing may be used as a trigger for starting the timer; even if the timer has been started, the timer may be cleared by executing the next printing process before the set amount of time has elapsed. In addition, the communication mode may be ended by a main unit operation made through the operation panel 305. Doing so makes it possible to execute the print without the user paying attention to the communication mode.

Second Embodiment

The present second embodiment also describes a use case in which the user selects an image to be printed by operating the terminal apparatus 200, after which the image is printed.

The second embodiment differs from the first embodiment in that information indicating an active MAC address is contained in the interface information acquired through the NFC touching action. In the use case described below, the user makes the NFC touching action, touching the terminal apparatus 200 to the printing apparatus 300. The terminal apparatus 200 then acquires the information of the interface that is currently active, and the selected image is printed by the printing apparatus 300 using the MAC address of the active interface. For example, of the wired MAC address and the wireless MAC address, the terminal apparatus 200 can through the NFC touching action acquire information indicating the MAC address currently active in the printing apparatus 300.

First, the user selects image data through an operation made using the operating unit 204. Here, a plurality of pieces of image data may be selected.

The user then performs the NFC touching action for bringing the (NFC unit 201 of the) terminal apparatus 200 toward the (NFC unit 306 of the) printing apparatus 300.

As a result, in step S1002, the terminal apparatus 200 receives an NDEF message in the NFC memory 605 within the NFC unit 306 of the printing apparatus 300.

After receiving the NDEF message, in step S1003, the terminal apparatus 200 determines whether a mode transition command for standing by for data reception has been issued to the printing apparatus 300 by the terminal apparatus 200. Information indicating whether or not the command has been issued is stored in the data memory 214 of the terminal apparatus 200. In the case where the mode transition command has not been issued, in step S1004, the terminal apparatus 200 acquires the information of the interface that is currently active, acquired from the NDEF message. S1004 can be realized, for example, by the terminal apparatus 200 acquiring information of the MAC address, among the plurality of MAC addresses contained in the NDEF message, that is active. Incidentally, an "active state" refers to a state in which the printing apparatus 300 has established a network connection and can acquire an IP address.

In step S1005, the terminal apparatus 200 confirms whether the MAC address of the interface in the active state, written in the NDEF message, is present on the same network as the terminal apparatus 200. In the case where the MAC address is present on the same network in step S1006, the terminal apparatus 200 can recognize the IP address of the printing apparatus 300. In the case where the IP address cannot be detected, the terminal apparatus 200 carries out steps S1011 and S1012. The processing of S1011 and S1012 is the same as that of S811 and S812, and thus detailed descriptions thereof will be omitted. Likewise, the processing of S1007 to S1010 is the same as that of S806 to S809, and thus detailed descriptions thereof will be omitted.

According to the present embodiment, in the case where, for example, a device search is carried out through broadcasting using a plurality of MAC addresses, devices searches using the MAC address of an inactive interface can be prevented. Accordingly, the present embodiment can lighten the burden of network communication.

Third Embodiment

The above first embodiment describes a case where the MAC address of a first interface and the MAC address of a second interface stored in the NDEF message are referred to in order. The first interface and the second interface may be given a priority order, and information for determining which interface to preferentially connect to may be held in the NDEF message. Whether the MAC address acquired based on the priority order in the NDEF message read by the terminal apparatus 200 is on the same network may then be detected.

Although the embodiments describe the processing apparatus that communicates with the terminal apparatus 200 as the printing apparatus (MFP) 300, the apparatus is not particularly limited to a printing apparatus as long as the apparatus can handle processing requests. For example, the apparatus may be a network scanner, network storage, or the like.

Fourth Embodiment

Figure 11B:
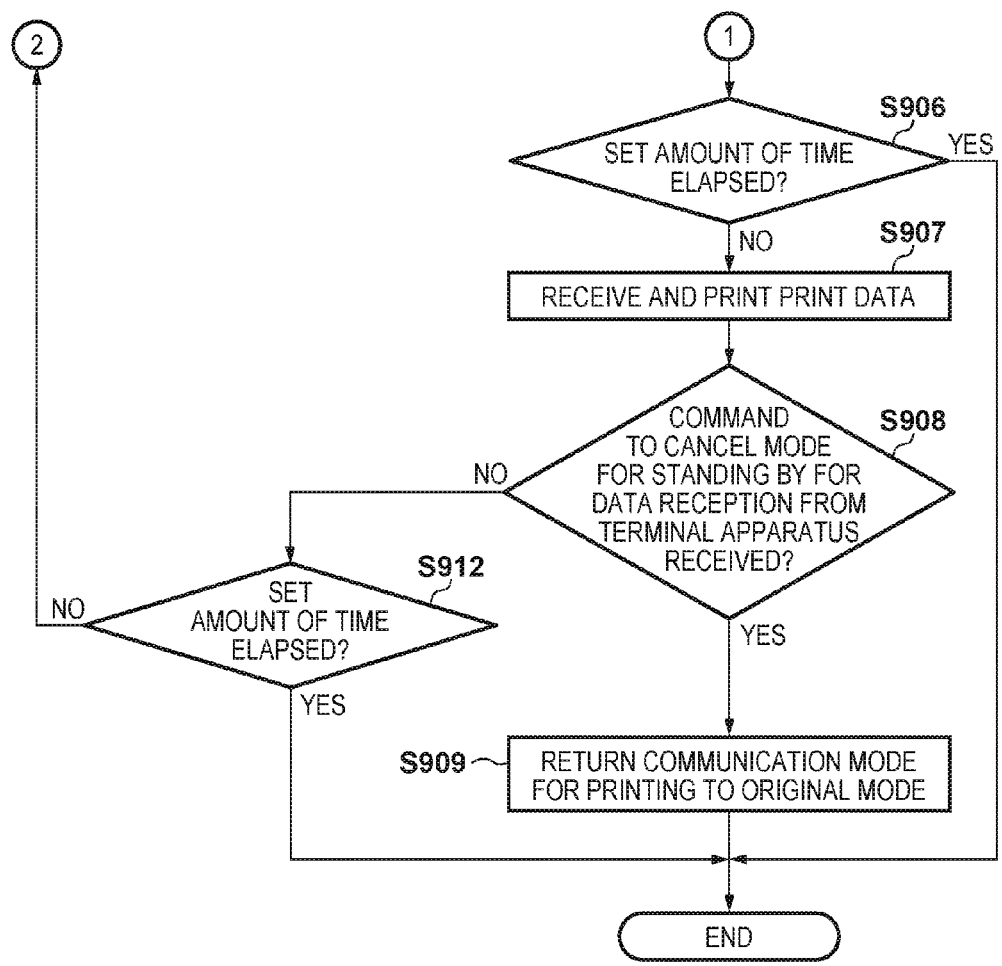

The present embodiment will use FIGS. 11A and 11B to describe a process in which the printing apparatus 300 overwrites the NDEF information in accordance with the active interface.

The printing apparatus 300 determines whether or not a selection instruction indicating the interface to activate has been received from the user through the operation panel 305 (S1101). For example, the printing apparatus 300 receives an instruction to activate one of the wired LAN and the wireless LAN. Note that the terminal apparatus 200 capable of communicating with the printing apparatus 300 may issue a selection instruction for selecting the interface to be activated. Alternatively, an information processing apparatus capable of communicating with the printing apparatus 300 may issue an instruction for selecting the interface to be activated.

In the case where it is determined in S1101 that the instruction has been received, the printing apparatus 300 writes the MAC address corresponding to the interface activated by the user instruction into the NDEF in the NFC memory 605 of the NFC unit 600 (S1102). FIG. 7 indicates the first MAC address of the first unit and the second MAC address of the second unit, of the two network interface units (or NICs) provided in the printing apparatus 300, as being held in the network information. However, in the present embodiment, the printing apparatus 300 writes only the MAC address corresponding to the activated interface in the network information illustrated in FIG. 7. For example, in the case where the wired LAN has been activated by the stated instruction, only the MAC address of the wired LAN is written in the network information illustrated in FIG. 7. On the other hand, in the case where the activated interface is changed from the wired LAN to the wireless LAN, the printing apparatus 300 overwrites the MAC address of the wired LAN with the MAC address of the wireless LAN in the network information illustrated in FIG. 7.

The printing apparatus 300 determines whether an NFC touching action has been made (S1103). The processing advances to S902 and on in the case where it has been determined that the NFC touching action has been made. However, the processing returns to S1101 in the case where the NFC touching action has not been made. Note that the processing of S902 on is the same as in FIG. 9, and thus detailed descriptions thereof will be omitted.

Through the stated processing, the terminal apparatus 200 can acquire the MAC address of the interface activated in the printing apparatus 300, and thus the correct connection to the printing apparatus 300 can be made.

Although the present application describes NFC as an example of short distance wireless communication, Bluetooth or the like, for example, may be used as another communication method. Likewise, although the present application describes a printing apparatus, a digital camera, a music player, or the like may be used as an alternative to the printing apparatus.

Other Embodiments

Embodiments of the present invention can also be realized by a computer of a system or apparatus that reads out and executes computer executable instructions (e. g., one or more programs) recorded on a storage medium (which may also be referred to more fully as a 'non-transitory computer-readable storage medium') to perform the functions of one or more of the above-described embodiments and/or that includes one or more circuits (e. g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e. g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-139166, filed Jul. 4, 2014, which is hereby incorporated by reference herein in its entirety.

What is claimed is:

1. A printing apparatus having a first wireless communication unit and a second wireless communication unit which can communicate at a communication speed higher than that of the first wireless communication unit, the printing apparatus comprising:

a communication control unit that, in a case where the first wireless communication unit communicates with a communication partner apparatus in a state that a wireless connection using the second wireless communication unit cannot be established in the printing apparatus, establishes a wireless connection between the printing apparatus and the communication partner apparatus using the second wireless communication unit;

a receiving unit that receives print data from the communication partner apparatus via the wireless connection established by the communication control unit; and a print control unit that executes a print processing based on the print data;

wherein a portion where the communication partner apparatus is brought for wireless communication using the first wireless communication unit is disposed on an operation unit having an operation display of the printing apparatus, wherein an angle between a surface including the operation display on the operation unit and a transparent surface to place a document for scan processing is changeable, after the print processing based on the print data is completed, the printing apparatus works in the state that the wireless connection using the second wireless communication unit cannot be established.

2. The apparatus according to claim 1, wherein, in a case that the communication partner apparatus gets closer to the first wireless communication unit while the printing apparatus is in a state that the wireless connection using the second wireless communication unit cannot be established, peer-to-peer (P2P) wireless connection between the printing apparatus and the communication partner apparatus using the second wireless communication unit is established.

3. The apparatus according to claim 1, wherein the first wireless communication unit is a Near Filed Communication (NFC) unit.

4. The apparatus according to claim 1, wherein the first wireless communication unit is a Blue Tooth unit.

5. The apparatus according to claim 1, wherein the second wireless communication unit is a wireless LAN unit.

6. The apparatus according to claim 1, wherein the operation unit is a cover plate.

7. The apparatus according to claim 1, wherein the state that the wireless connection using the second wireless communication unit cannot be established in the printing apparatus is a state that the wireless connection is inactivated.

8. The apparatus according to claim 1, wherein, in a case where no print data is received from the communication partner apparatus within a predetermined period after the wireless connection between the printing apparatus and the communication partner apparatus using the second wireless communication unit is established, the printing apparatus works in the state that the wireless connection using the second wireless communication unit cannot be established.

9. The apparatus according to claim 1, further comprising:

a determination unit that, in a case that the communication partner apparatus gets closer to the first wireless communication unit while the printing apparatus is in the state that the wireless connection using the second wireless communication unit cannot be established, determines whether a request in an internet protocol level is received from the communication partner apparatus, if the determination unit determines that the request is not received from the communication partner apparatus, the wireless connection between the printing apparatus and the communication partner apparatus using the second wireless communication unit is established.

10. The apparatus according to claim 1, further comprising,
a scan unit configured to read a document,
wherein the document placed on the transparent surface is read with the scan unit.

11. The apparatus according to claim 1, wherein the printing apparatus is an inkjet printer.

12. A control method for a printing apparatus having a first wireless communication unit and a second wireless communication unit which can communicate at a communication speed higher than that of the first wireless communication unit, the method comprising:
in a case where the first wireless communication unit communicates with a communication partner apparatus in a state that a wireless connection using the second wireless communication unit cannot be established in the printing apparatus, establishing a wireless connection between the printing apparatus and the communication partner apparatus using the second wireless communication unit;
receiving print data from the communication partner apparatus via the established wireless connection; and
executing a print processing based on the print data;
wherein a portion where the communication partner apparatus is brought for wireless communication using the first wireless communication unit is disposed on an operation unit having an operation display of the printing apparatus,
wherein an angle between a surface including the operation display on the operation unit and a transparent surface to place a document for scan processing is changeable,
after the print processing based on the print data is completed, the printing apparatus works in the state that the wireless connection using the second wireless communication unit cannot be established.

13. The method according to claim 12, wherein, in a case that the communication partner apparatus gets closer to the first wireless communication unit while the printing apparatus is in the state that the wireless connection using the second wireless communication unit cannot be established, peer-to-peer (P2P) wireless connection between the printing apparatus and the communication partner apparatus using the second wireless communication unit is established.

14. The method according to claim 12, wherein the first wireless communication unit is a Near Filed Communication (NFC) unit.

15. The method according to claim 12, wherein the first wireless communication unit is a Blue Tooth unit.

16. The method according to claim 12, wherein the second wireless communication unit is a wireless LAN unit.

17. The method according to claim 12, wherein the operation unit is an cover plate.

18. The method according to claim 12, wherein the state that the wireless connection using the second wireless communication unit cannot be established in the printing apparatus is a state that the wireless connection is inactivated.

19. The method according to claim 12, wherein, in a case where no print data is received from the communication partner apparatus within a predetermined period after the wireless connection between the printing apparatus and the communication partner apparatus using the second wireless communication unit is established, the printing apparatus works in the state that the wireless connection using the second wireless communication unit cannot be established.

20. The method according to claim 12, further comprising:
in a case that the communication partner apparatus gets closer to the first wireless communication unit while the printing apparatus is in the state that the wireless connection using the second wireless communication unit cannot be established, determining whether a request in an internet protocol level is received from the communication partner apparatus,
if it is determined that the request is not received from the communication partner apparatus, establishing the wireless connection between the printing apparatus and the communication partner apparatus using the second wireless communication unit.

21. The method according to claim 12, further comprising,
reading a document by using a scan unit,
wherein the document placed on the transparent surface is read with the scan unit.

22. The method according to claim 12, wherein the printing apparatus is an inkjet printer.

* * * * *